(12) United States Patent
Jen et al.

(10) Patent No.: US 11,933,989 B2
(45) Date of Patent: Mar. 19, 2024

(54) HEADBAND DEVICE

(71) Applicant: Wistron Corp., New Taipei (TW)

(72) Inventors: Tsu Yin Jen, New Taipei (TW); Pei Hsin Huang, New Taipei (TW); Lee-Hua Yu, New Taipei (TW)

(73) Assignee: WISTRON CORP., New Taipei (TW)

( * ) Notice: Subject to any disclaimer, the term of this patent is extended or adjusted under 35 U.S.C. 154(b) by 303 days.

(21) Appl. No.: 17/494,504

(22) Filed: Oct. 5, 2021

(65) Prior Publication Data

US 2022/0404628 A1    Dec. 22, 2022

(30) Foreign Application Priority Data

Jun. 22, 2021  (TW) .................................. 110122666

(51) Int. Cl.
*G02B 27/01*        (2006.01)
(52) U.S. Cl.
CPC ................................ *G02B 27/0176* (2013.01)
(58) Field of Classification Search
CPC ........ G02B 27/0176; G02B 2027/0154; G02B 2027/0161
USPC ...................................................... 224/181
See application file for complete search history.

(56) References Cited

U.S. PATENT DOCUMENTS

| | | | | |
|---|---|---|---|---|
| 10,459,236 B2 * | 10/2019 | Lee | ...................... | G02B 27/017 |
| 10,663,737 B1 * | 5/2020 | Magrath | ............ | G02B 27/0176 |
| 10,670,870 B2 * | 6/2020 | Chueh | ................ | G02B 27/0176 |
| 2011/0265254 A1 * | 11/2011 | Ma | ......................... | A61H 7/006 2/420 |
| 2021/0389594 A1 * | 12/2021 | Xue | ................... | G02B 27/0176 |

FOREIGN PATENT DOCUMENTS

| | | |
|---|---|---|
| CN | 105807425 A | 7/2016 |
| CN | 106575041 A | 4/2017 |
| CN | 207261577 U | 4/2018 |
| CN | 110873966 A | 3/2020 |
| CN | 211293449 U | 8/2020 |
| CN | 212675280 U | 3/2021 |
| CN | 112925099 A | 6/2021 |
| JP | 2015-126396 A | 7/2015 |
| JP | 2017-147520 A | 8/2017 |
| TW | 202119959 A | 6/2021 |

* cited by examiner

*Primary Examiner* — Adam J Waggenspack (57) ABSTRACT

A headband device is provided. The headband device includes a first knob, a first transmission mechanism, a vertical adjustment mechanism and a vertical headband. The first knob is rotated around a first axis. The first transmission mechanism is connected to the first knob, wherein the first transmission mechanism is rotated by the first knob around a second axis, wherein the first axis is perpendicular to the second axis. The vertical adjustment mechanism is adapted to be connected to the first transmission mechanism, wherein the vertical adjustment mechanism is rotated by the first transmission mechanism and is rotated around the second axis. The vertical headband is connected to the vertical adjustment mechanism, wherein the vertical headband is moved by the vertical adjustment mechanism and the tightness of the vertical headband is adjustable.

19 Claims, 14 Drawing Sheets

HEADBAND DEVICE

CROSS REFERENCE TO RELATED APPLICATIONS

This application claims priority of Taiwan Patent Application No. 110122666, filed on Jun. 22, 2021, the entirety of which is incorporated by reference herein.

BACKGROUND OF THE INVENTION

Field of the Invention

The present invention relates to a headband device, and in particular to a headband device for a head-mounted display.

Description of the Related Art

Conventional head-mounted devices use horizontal headbands, and the tightness of the horizontal headband can be adjusted by the user. However, with the increased weight and size of head-mounted devices (including head-mounted displays), horizontal headbands are no longer sufficient to support the head-mounted device, and a vertical headband is required to better distribute the weight. Conventionally, a user cannot conveniently look straight at the headband when adjusting it. Therefore, a headband device that allows headbands (the vertical headband and the horizontal headbands) to be adjusted and easily assembled is required.

BRIEF SUMMARY OF THE INVENTION

Embodiments of the invention are provided to address the aforementioned difficulty.

In one embodiment, a headband device is provided. The headband device includes a first knob, a first transmission mechanism, a vertical adjustment mechanism and a vertical headband. The first knob is rotated around a first axis. The first transmission mechanism is connected to the first knob, wherein the first transmission mechanism is rotated by the first knob around a second axis, wherein the first axis is perpendicular to the second axis. The vertical adjustment mechanism is adapted to be connected to the first transmission mechanism, wherein the vertical adjustment mechanism is rotated by the first transmission mechanism and is rotated around the second axis. The vertical headband is connected to the vertical adjustment mechanism, wherein the vertical headband is moved by the vertical adjustment mechanism and the tightness of the vertical headband is adjustable.

In one embodiment, a headband device is provided. The headband device includes a vertical headband and a magnetic member. The magnetic member is disposed on the vertical headband, and the vertical head band is detachably connected to a horizontal headband via the magnetic member.

Utilizing the headband device of the embodiment of the invention, the user can rotate the first knob and the second knob simultaneously in the synchronous state, and the tightness of the horizontal headbands and the vertical headband is easily adjusted. Additionally, the headband device can be switched from the synchronous state to the asynchronous state by pressing the second knob, and the user can adjust the tightness of the horizontal headband and the tightness of the vertical headband separately. In one embodiment of the invention, the horizontal headband and the vertical headband can be easily combined by magnetic force.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
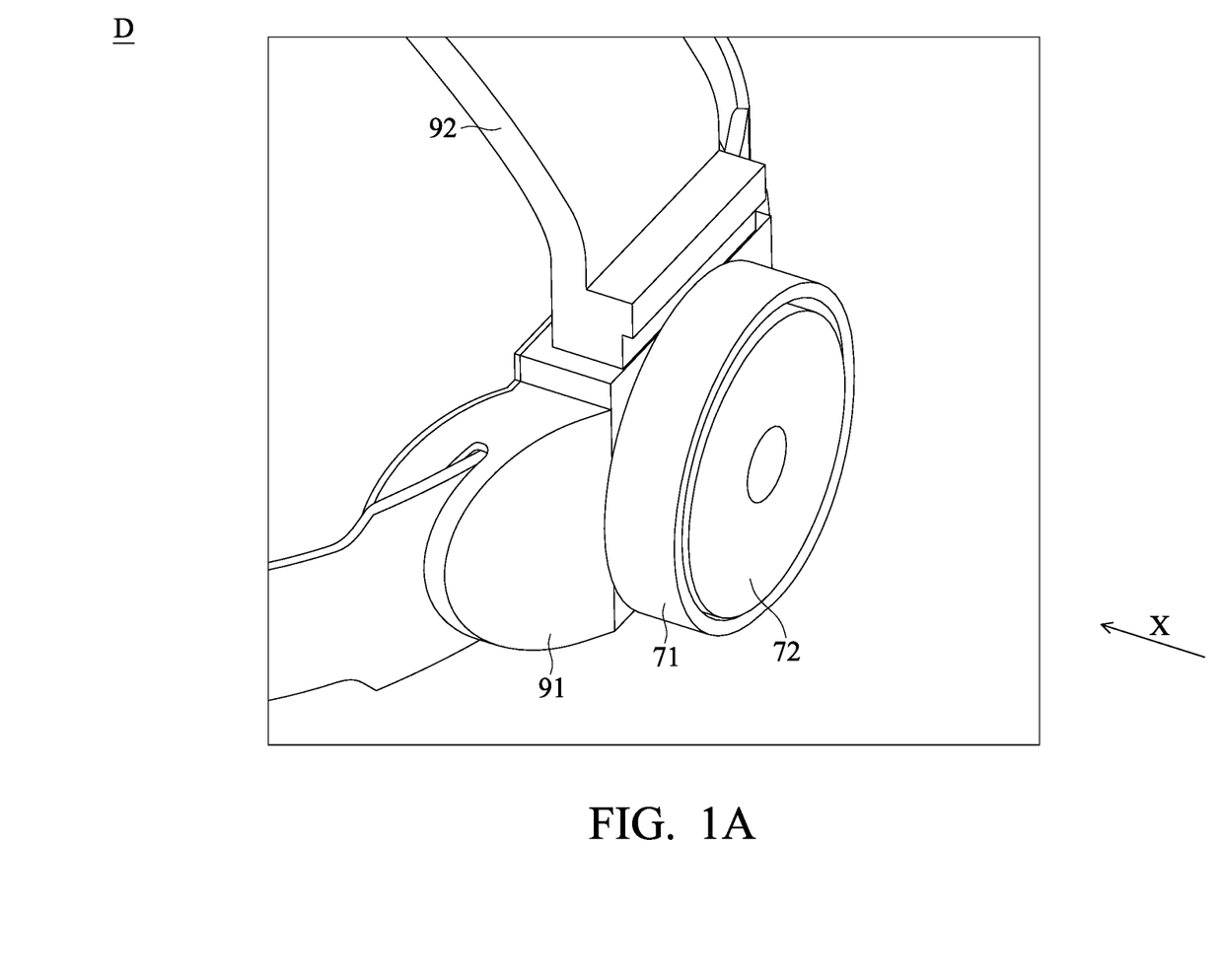
FIG. 1A shows a headband device of an embodiment of the invention, wherein the headband is in a synchronous state.
Figure 1B:
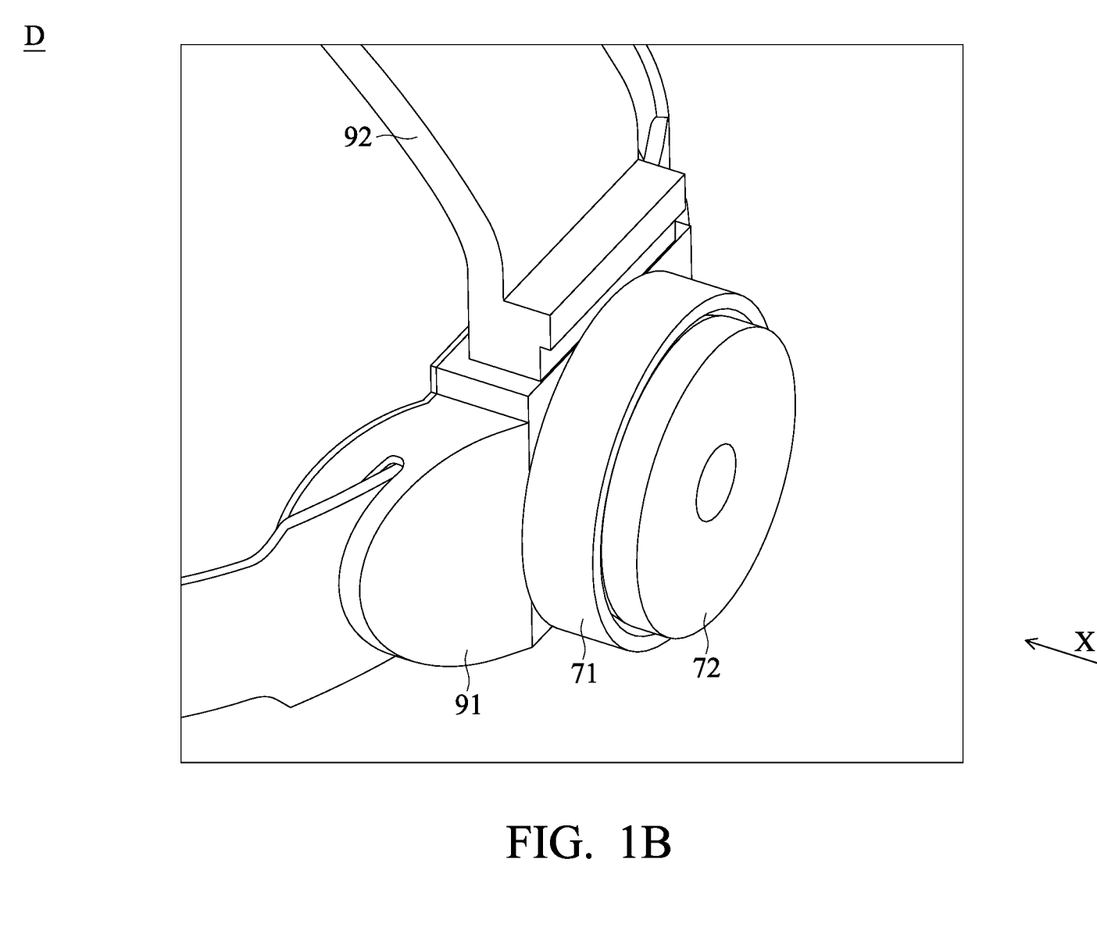
FIG. 1B shows the headband device of the embodiment of the invention, wherein the headband is in an asynchronous state.
Figure 2:
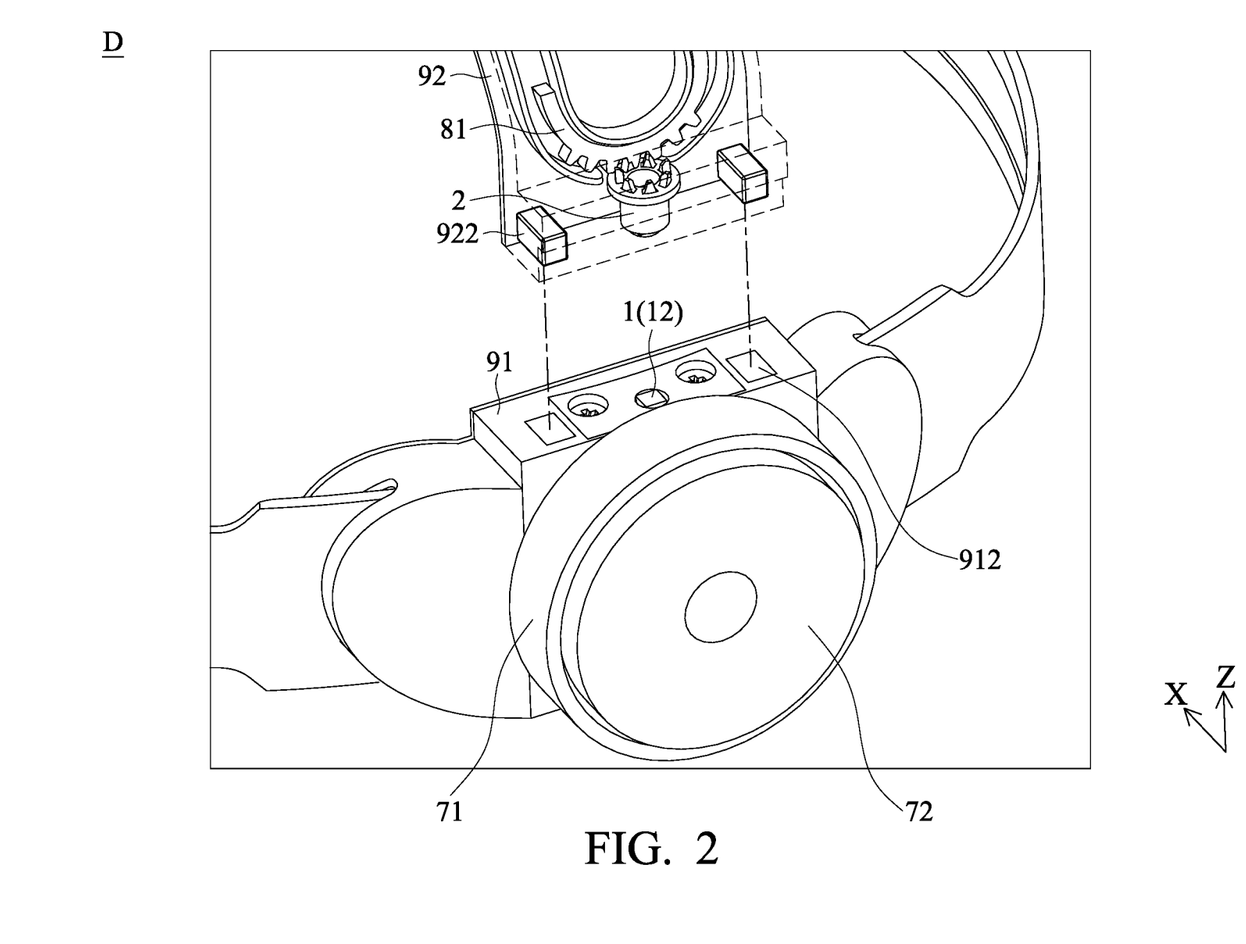
FIG. 2 shows the vertical head band combined to the vertical adjustment mechanism of the embodiment of the invention.

FIG. 1A shows a headband device of an embodiment of the invention, wherein the headband is in a synchronous state. FIG. 1B shows the headband device of the embodiment of the invention, wherein the headband is in an asynchronous state. FIG. 2 shows the vertical head band combined to the vertical adjustment mechanism of the embodiment of the invention. With reference to FIGS. 1A, 1B and 2, the headband device D of the embodiment of the invention includes a first knob 71, a first transmission mechanism 1, a vertical adjustment mechanism 2 and a vertical headband 81. The first knob 71 is rotated around a first axis X. The first transmission mechanism 1 is connected to the first knob 71. The first transmission mechanism 1 is rotated by the first knob 71, and is rotated around a second axis Z. The first axis X is perpendicular to the second axis Z. The vertical adjustment mechanism 2 is adapted to be connected to the first transmission mechanism 1. The vertical adjustment mechanism 2 is rotated by the first transmission mechanism 1 and is rotated around the second axis Z. The vertical headband 81 is connected to the vertical adjustment mechanism 2. The vertical headband 81 is moved by the vertical adjustment mechanism 2 and the tightness of the vertical headband is adjustable.

Figure 3:
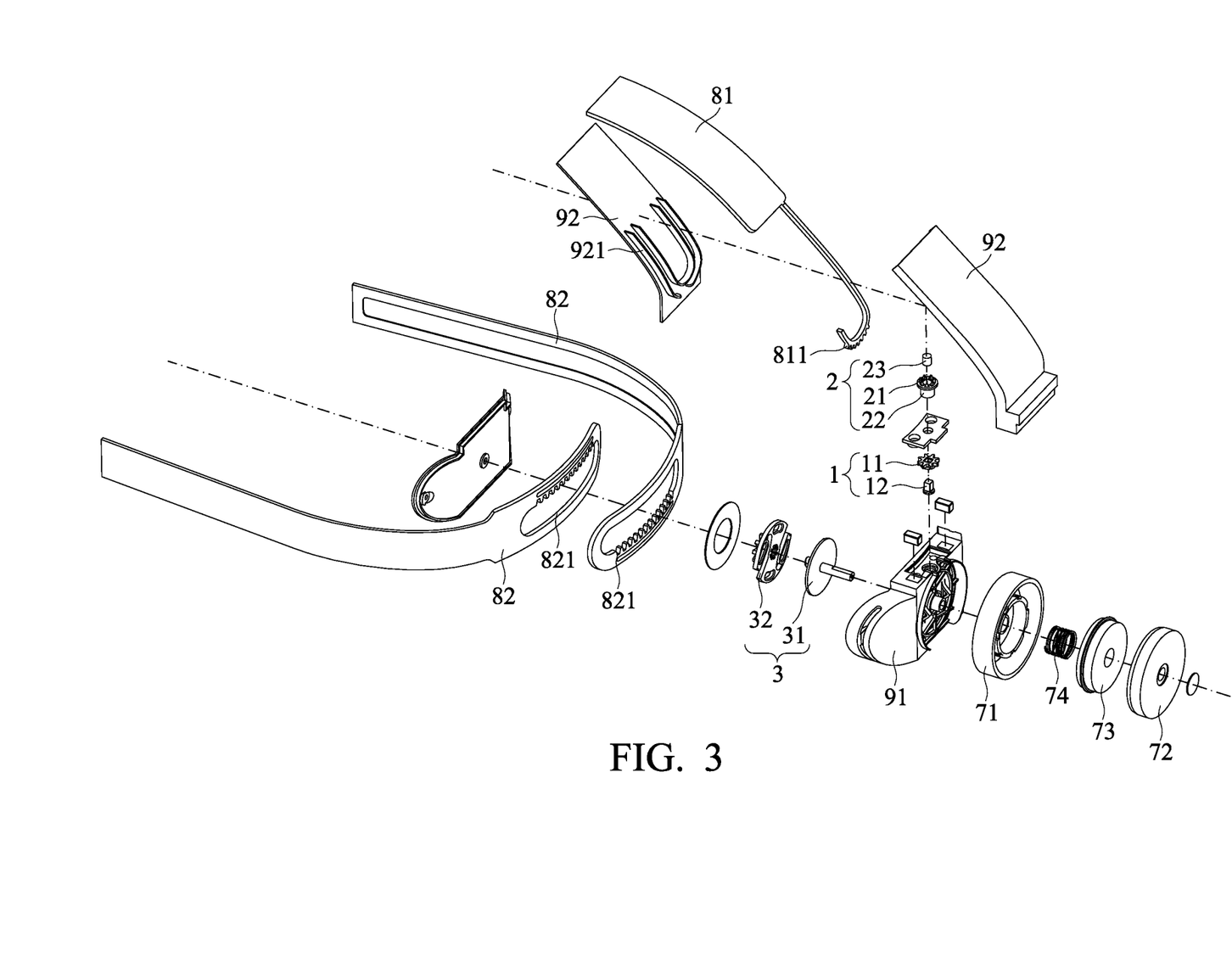
FIG. 3 is an exploded view of the headband device of the embodiment of the invention.
Figure 4A:
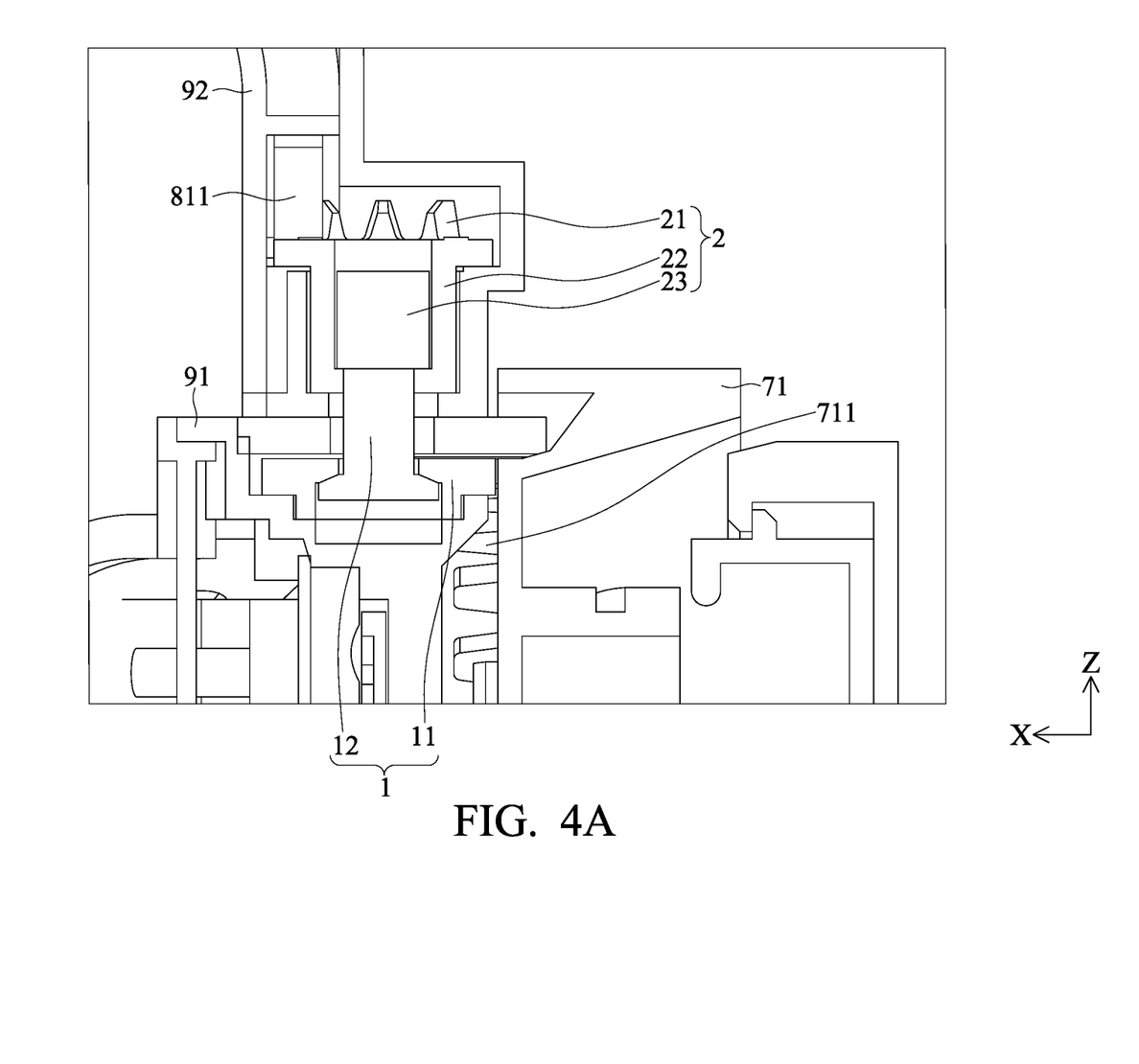
FIG. 4A shows the details of the vertical headband and the vertical adjustment mechanism of the embodiment of the invention, wherein the first wedging member is in the first member position.

FIG. 3 is an exploded view of the headband device of the embodiment of the invention. FIG. 4A shows the details of the vertical headband and the vertical adjustment mechanism of the embodiment of the invention, wherein the first wedging member is in the first member position. With reference to FIGS. 3 and 4A, in one embodiment, the first transmission mechanism 1 comprises a first gear 11 and a first wedging member 12. The first knob 71 comprises a knob gear 711. The knob gear 711 meshes with the first gear 11. The knob gear 711 rotates the first gear 11. The first gear 11 rotates the first wedging member 12.

With reference to FIG. 4A, in one embodiment, the first gear 11 and the first wedging member 12 are rotated around the second axis Z.

With reference to FIGS. 3 and 4A, in one embodiment, the vertical headband 8 comprises a first rack 811. The vertical adjustment mechanism 2 comprises a second gear 21 and a second wedging member 22. The second wedging member 22 is adapted to be wedged against the first wedged member 12. The second wedged member 22 is adapted to rotate the second gear 21. The second gear 21 meshes with the first rack 811. In this embodiment, the second gear 21 and the second wedging member 22 are integrally formed.

With reference to FIG. 4A, in one embodiment, the second gear 21 and the second wedging member 22 are rotated around the second axis Z.

Figure 4B:
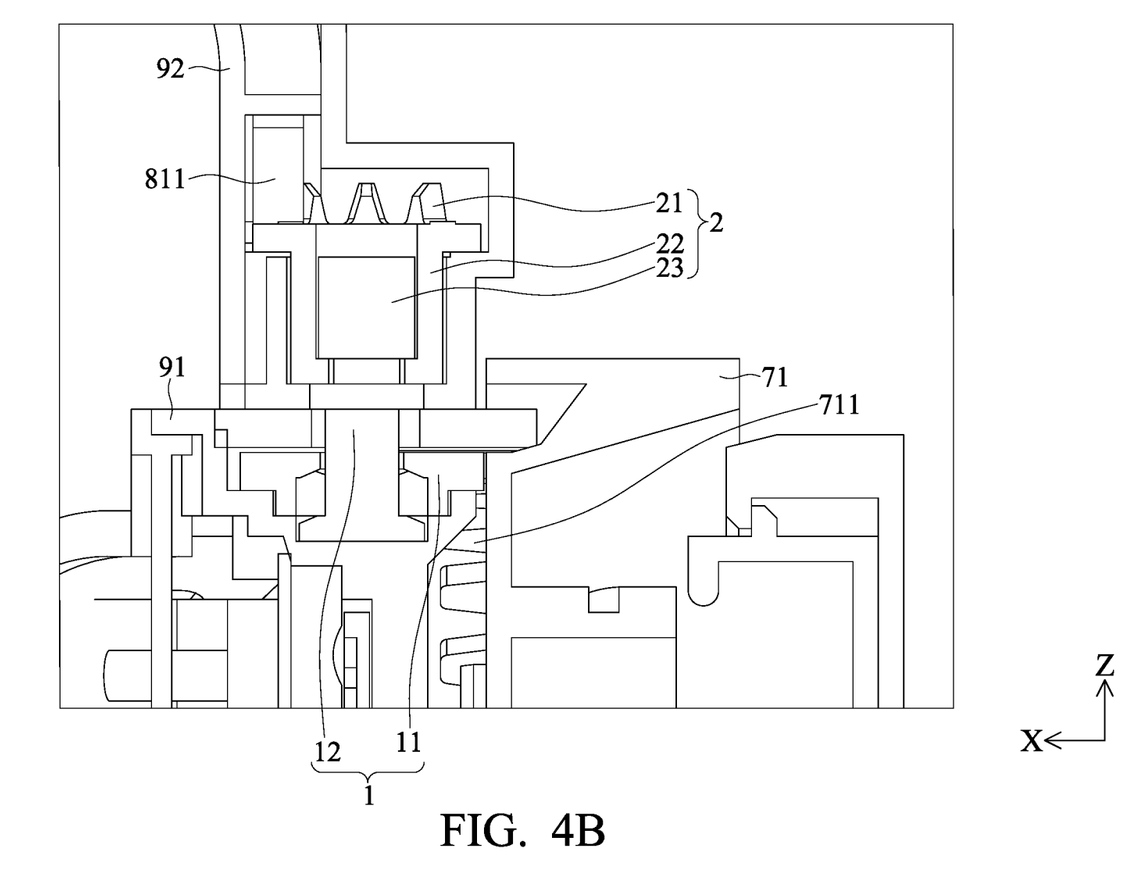
FIG. 4B shows the details of the vertical headband and the vertical adjustment mechanism of the embodiment of the invention, wherein the first wedging member is in the second member position.

FIG. 4B shows the details of the vertical headband and the vertical adjustment mechanism of the embodiment of the invention, wherein the first wedging member is in the second member position. With reference to FIGS. 4A and 4B, in one embodiment, the first wedging member 12 comprises a wedging post. The second wedging member 22 comprises a wedging recess. The first wedging member 12 is adapted to be inserted into the second wedging member 22. The first wedging member 12 is moved between a first member position (FIG. 4A) and a second member position (FIG. 4B). When the first wedging member 12 is in the first member position (FIG. 4A), the first wedging member 12 is connected to the second wedging member 22. When the first wedging member 12 is in the second member position (FIG. 4B), the first wedging member 12 is separated from the second wedging member 22.

With reference to FIGS. 2, 4A and 4B, in one embodiment, the headband device further comprises a device housing 91. When the first wedging member 12 is in the first member position, the first wedging member 12 protrudes from the exterior of the device housing 91. When the first wedging member 12 is in the second member position, the first wedging member 12 is inside the device housing 91, wherein the first wedging member 12 or the second wedging member 22 is a magnetic member. In this embodiment, the vertical adjustment mechanism 2 further includes a magnet 23 (magnetic member). The magnet 23 is disposed in the second wedging member 22 to attract the first wedging member 12. When the second wedging member 22 nears the first wedging member 12, the first wedging member 12 is attracted by the magnet 23 and is moved from the second member position to the first member position to be combined to the second wedging member 22.

With reference to FIGS. 2, 3, 4A and 4B, in one embodiment, the headband device further comprises a mechanism housing 92. The vertical adjustment mechanism 2 is located in the mechanism housing 92. A restriction groove 921 is formed in the mechanism housing 92 (FIG. 3). At least a portion of the vertical headband 81 is restricted by the restriction groove 921.

With reference to FIG. 2 in one embodiment, the device housing 91 comprises a first magnetic portion 912. The mechanism housing 92 comprises a second magnetic portion 922. The first magnetic portion 912 is adapted to be connected to the second magnetic portion 922 by magnetic force.

With reference to FIGS. 1A, 1B and 3, in one embodiment, the headband device further comprises a second knob 72, a horizontal adjustment mechanism 3 and two horizontal headbands 82. The horizontal adjustment mechanism 3 is connected to the second knob 72. The horizontal headbands 82 are connected to the horizontal adjustment mechanism 3. The horizontal headbands 82 are moved by the horizontal adjustment mechanism 3 and the tightness of the horizontal headbands is adjustable.

With reference to FIGS. 1A, 1B and 3, in one embodiment, the second knob 72 rotates around the first axis X. In a synchronous state (FIG. 1A), the second knob 72 is rotated with the first knob 71. In an asynchronous state (FIG. 1B), the second knob 72 and the first knob 71 are rotated separately.

Figure 5A:
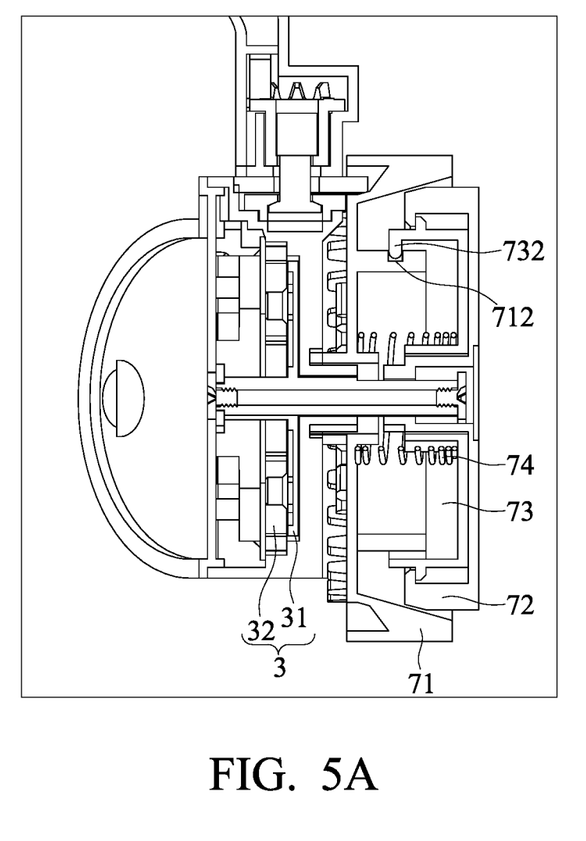
FIG. 5A is a cross sectional view of the headband device of the embodiment of the invention, wherein the headband device is in the synchronous state.
Figure 5B:
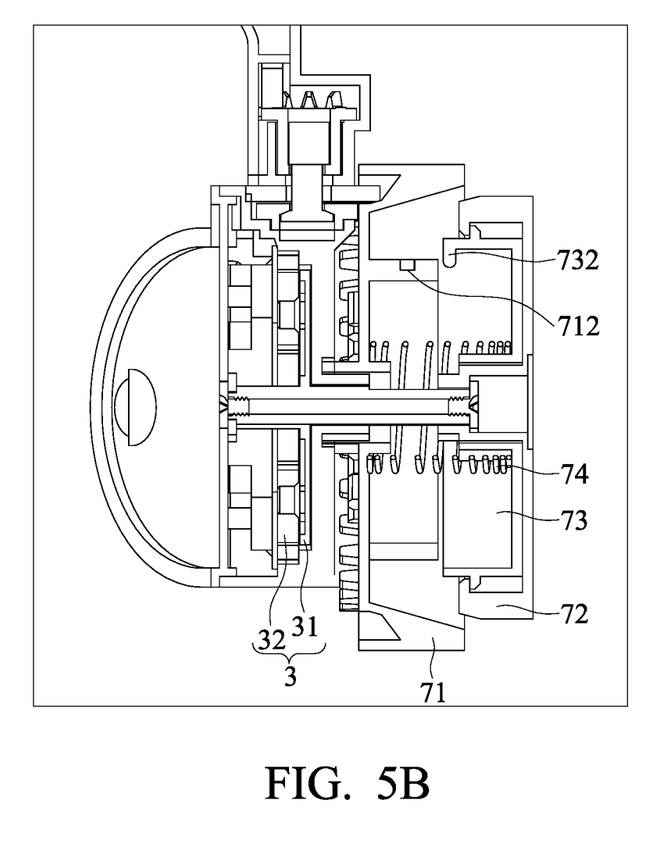
FIG. 5B is a cross sectional view of the headband device of the embodiment of the invention, wherein the headband device is in the asynchronous state.

FIG. 5A is a cross sectional view of the headband device of the embodiment of the invention, wherein the headband device is in the synchronous state. FIG. 5B is a cross sectional view of the headband device of the embodiment of the invention, wherein the headband device is in the asynchronous state. With reference to FIGS. 3, 5A and 5B, in one embodiment, the headband device further comprises a rotational plate 73 and a spring 74. The rotational plate 73 is affixed to the second knob 72. The spring 74 is disposed between the rotational plate 73 and the first knob 71. In the synchronous state (FIG. 5A), the rotational plate 73 is wedged against the first knob 71. In the asynchronous state (FIG. 5B), the rotational plate 73 is separated from the first knob 71.

Figure 6A:
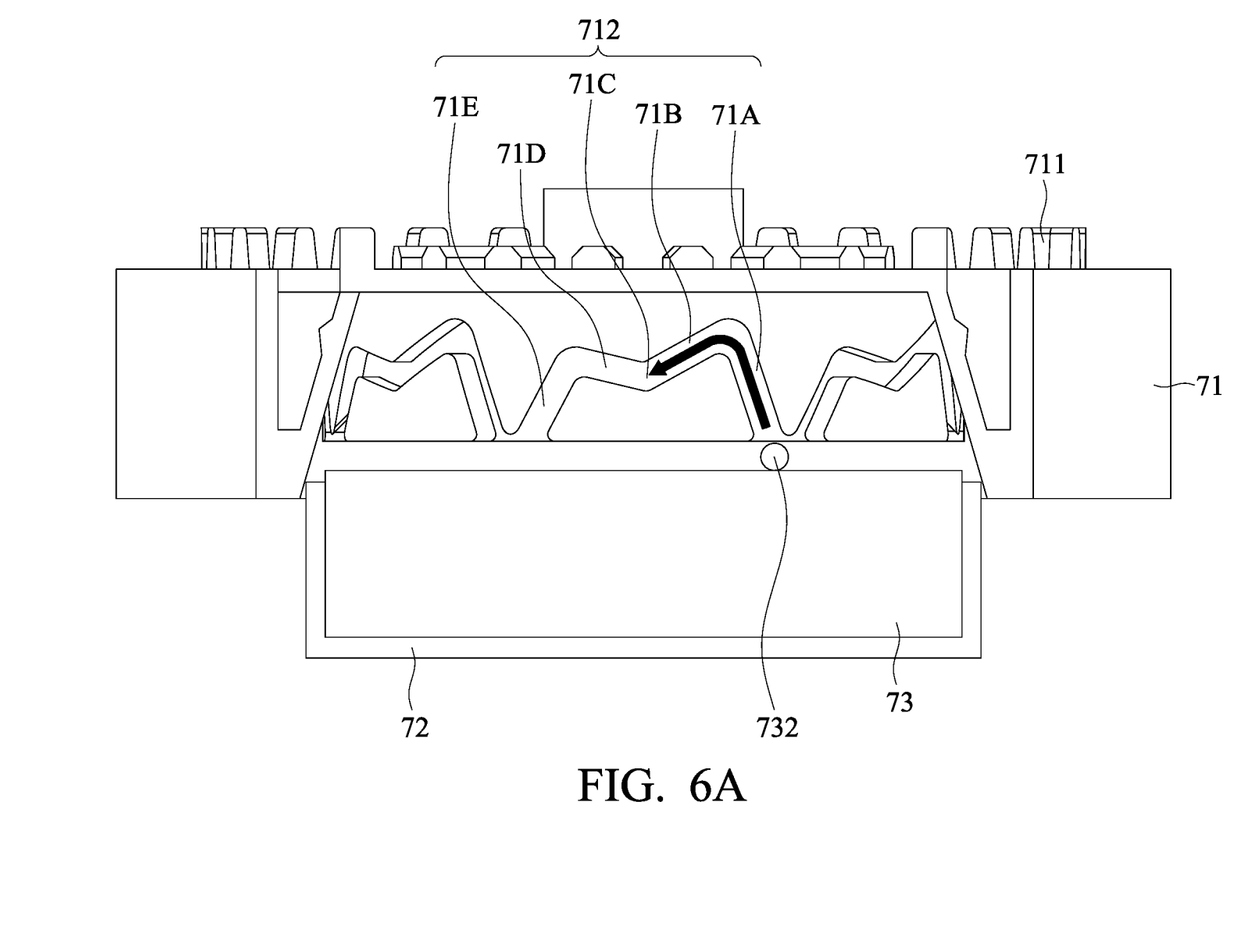
FIGS. 6A, 6B and 6C show the details of the zigzag groove of the embodiment of the invention.
Figure 6B:
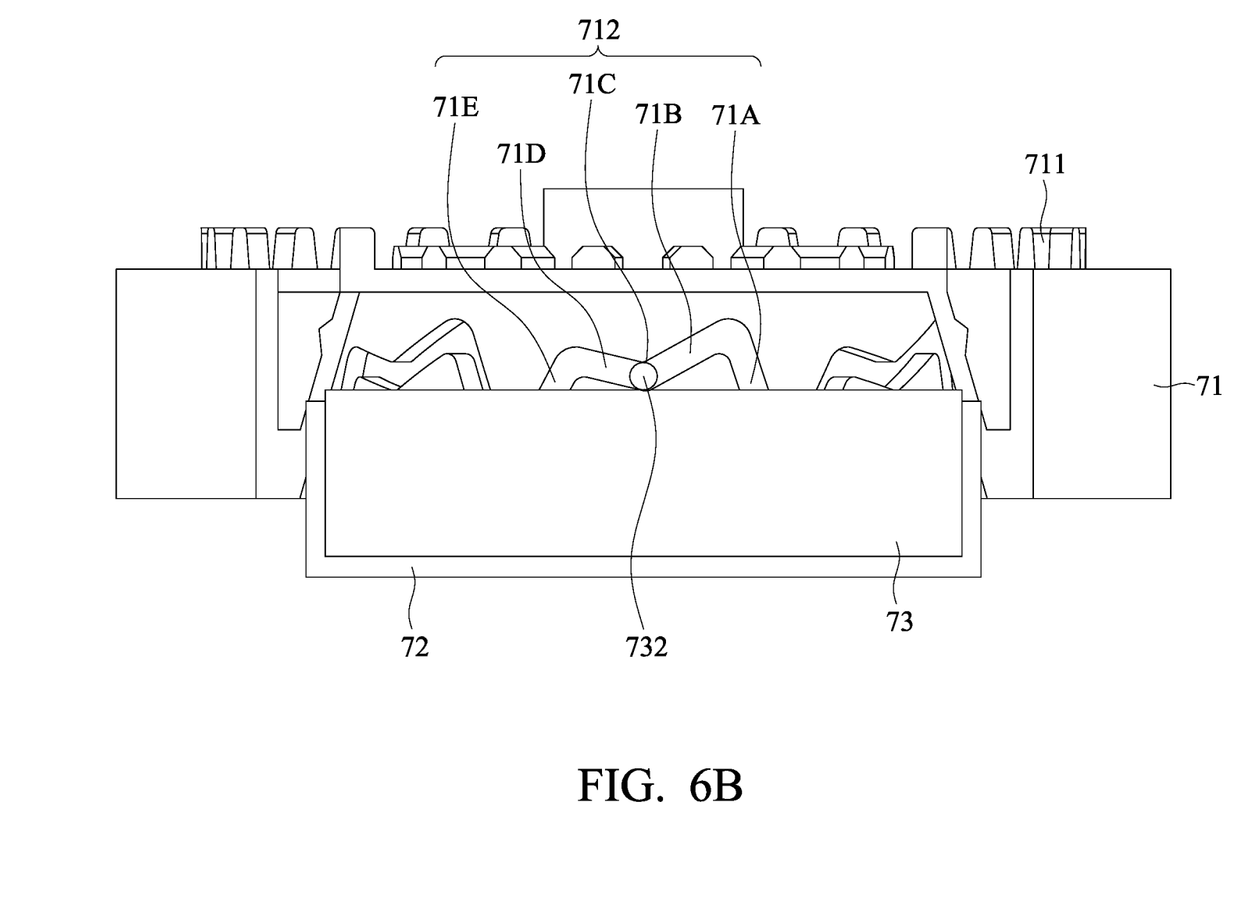
Figure 6C:
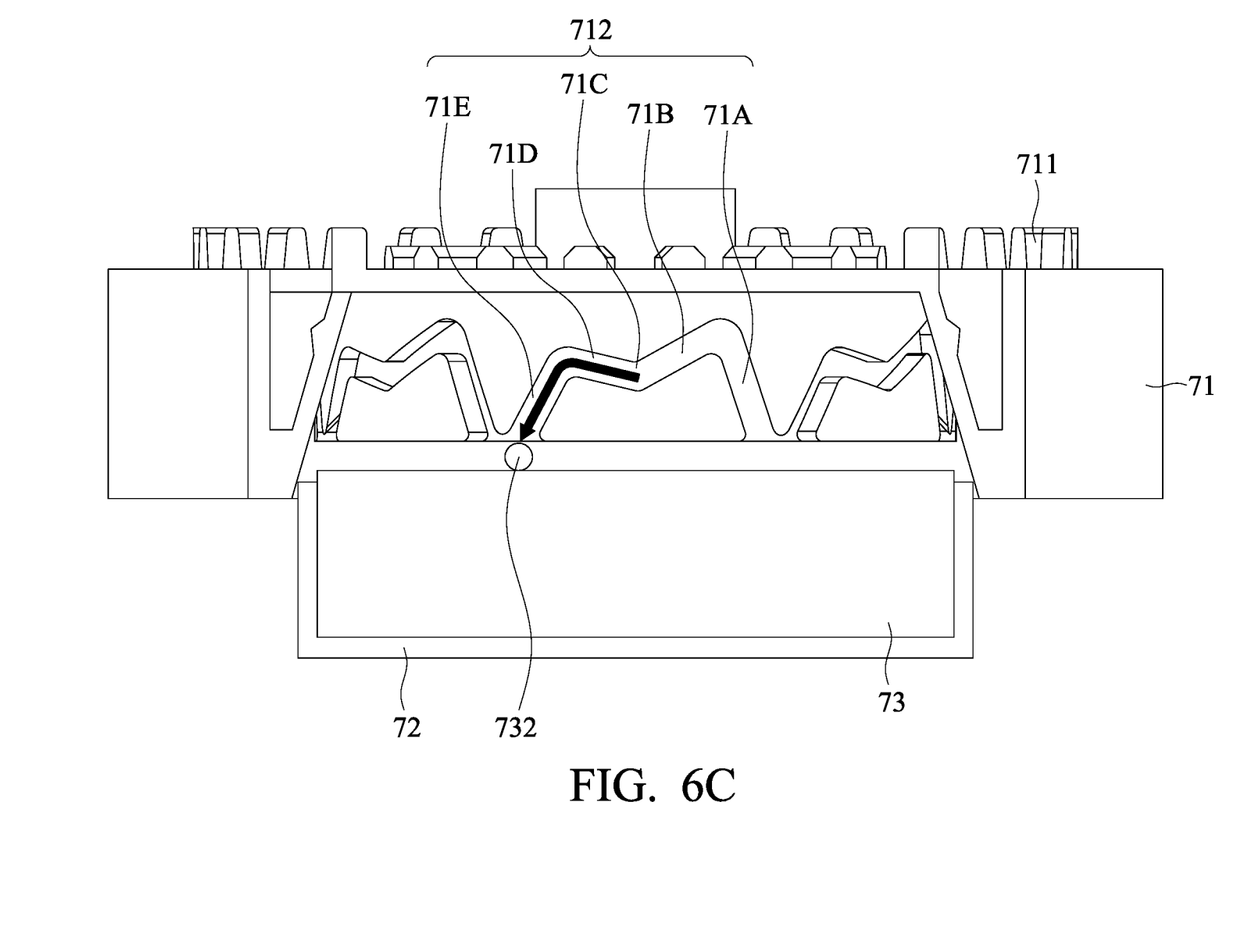

FIGS. 6A, 6B and 6C show the details of the zigzag groove of the embodiment of the invention. With reference to FIGS. 5A, 5B, 6A, 6B and 6C, in one embodiment, the first knob 71 comprises a zigzag groove 712. The rotational plate 73 comprises a plate post 732. In the synchronous state, the plate post 732 stays in the zigzag groove 712.

FIGS. 6A, 6B and 6C, in one embodiment, the zigzag groove 712 comprises an inlet section 71A, a first guiding section 71B, a stop point 71C, a second guiding section 71D and an outlet section 71E. The stop point 71C is located between the first guiding section 71B and the second guiding section 71D. When the headband device is switched from the asynchronous state to the synchronous state, the second knob 72 is pressed, the plate post 732 enters the zigzag groove 712 via the inlet section 71A and passes the first guising section 71B to the stop point 71C (FIG. 6A). In the synchronous state, the plate post 732 stays in the stop point 71C (FIG. 6B). When the headband device is switched from the synchronous state to the asynchronous state, the second knob 72 is pressed again, the plate post 732 leaves the zigzag groove 712 via the second guiding section 71D and the outlet section 71E (FIG. 6C), wherein the spring 74 provides elastic force to move the plate post 732 being separated from the zigzag groove 712.

With reference to FIGS. 3, 5A and 5B, in one embodiment, the horizontal adjustment mechanism 3 comprises a transmission shaft 31 and a ratchet 32. Each horizontal headband 82 comprises a second rack 821. The transmission shaft 31 is connected to the second knob 72. The ratchet 32 is connected to the transmission shaft 31. The ratchet 32 comprises a third gear (not shown), and the second rack 821 meshes with the third gear.

Figure 7A:
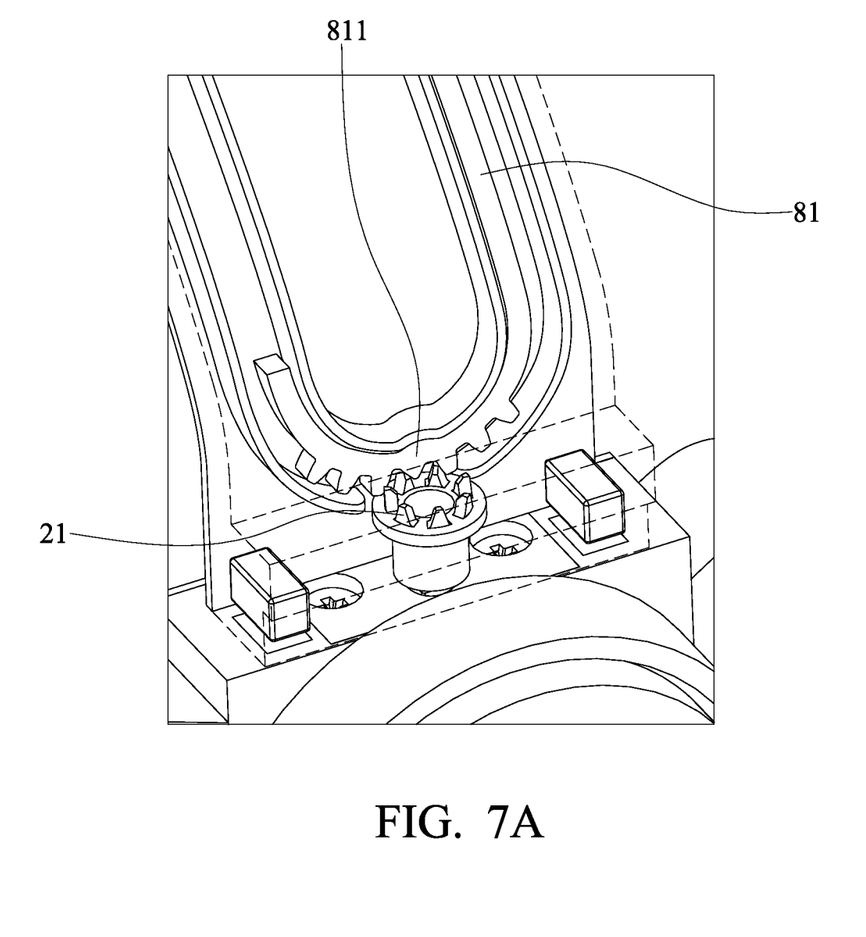
FIG. 7A shows the deformation of the first rack of the embodiment of the invention.
Figure 7B:
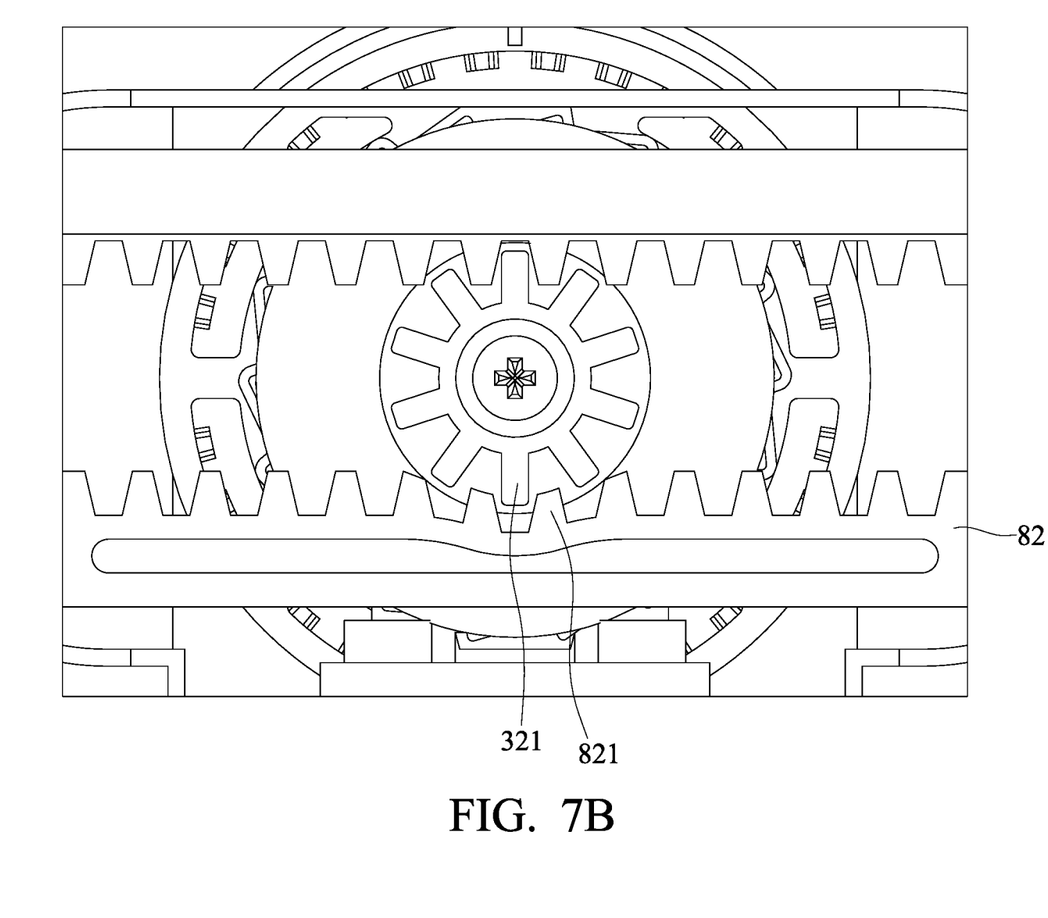
FIG. 7B shows the deformation of the second rack of the embodiment of the invention.

FIG. 7A shows the deformation of the first rack of the embodiment of the invention. FIG. 7B shows the deformation of the second rack of the embodiment of the invention. With reference to FIG. 7A, if the vertical headband 81 is tighten to the limit and the second gear 21 keeps being rotated, the first rack 811 is deformed, and the vertical headband 81 is prevented from further tightened. Therefore, in the synchronous state, the horizontal headband 82 can be further tightened without tightening the vertical headband 81. Similarly, wither reference to FIG. 7B, if the horizontal headband 82 is tighten to the limit and the third gear 321 keeps being rotated, the second rack 821 is deformed, and the second headbands 82 are prevented from further tightened. Therefore, in the synchronous state, the vertical headband 81 can be further tightened without tightening the horizontal headband 82.

Figure 8:
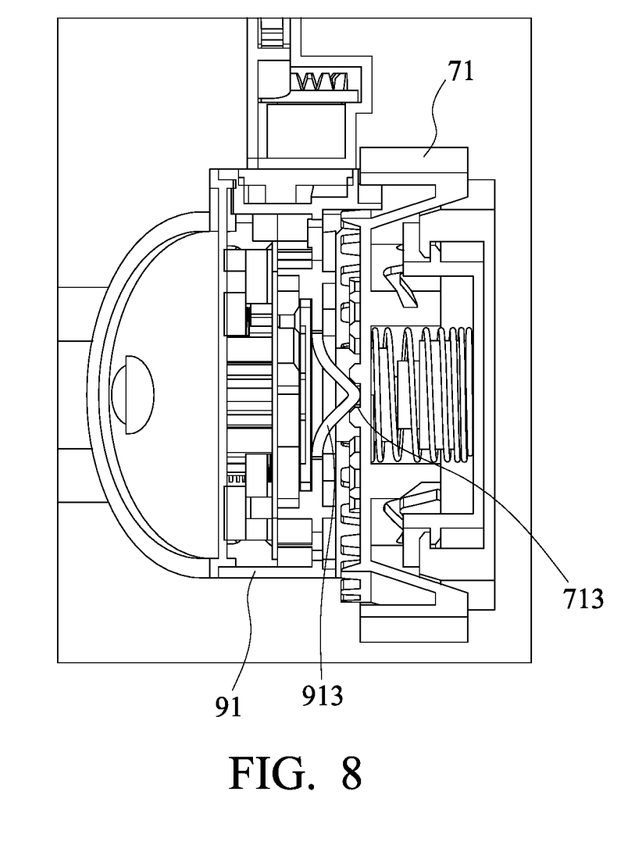
FIG. 8 shows another cross sectional view of the headband device of the embodiment of the invention.

FIG. 8 shows another cross sectional view of the headband device of the embodiment of the invention. With reference to FIG. 8, in one embodiment, the device housing 91 further comprises at least one elastic arm 913. The first knob further comprises a plurality of stopping slots 713. The elastic arm 913 is adapted to wedge against one of the stopping slots 713, and the first knob 71 is prevented from reverse rotation.

Utilizing the headband device of the embodiment of the invention, the user can rotate the first knob and the second knob simultaneously in the synchronous state, and the tightness of the horizontal headbands and the vertical headband is easily adjusted. Additionally, the headband device can be switched from the synchronous state to the asynchronous state by pressing the second knob, and the user can adjust the tightness of the horizontal headband and the tightness of the vertical headband separately. In one embodiment of the invention, the horizontal headband and the vertical headband can be easily combined by magnetic force.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A headband device, comprising:
   a first knob, rotated around a first axis;
   a first transmission mechanism, connected to the first knob, wherein the first transmission mechanism is rotated by the first knob around a second axis, wherein the first axis is perpendicular to the second axis;
   a vertical adjustment mechanism, adapted to be connected to the first transmission mechanism, wherein the vertical adjustment mechanism is rotated by the first transmission mechanism and is rotated around the second axis; and
   a vertical headband, connected to the vertical adjustment mechanism, wherein the vertical headband is moved by the vertical adjustment mechanism and the tightness of the vertical headband is adjustable.

2. The headband device as claimed in claim 1, wherein the first transmission mechanism comprises a first gear and a first wedging member, the first knob comprises a knob gear, the knob gear meshes with the first gear, the knob gear rotates the first gear, and the first gear rotates the first wedging member.

3. The headband device as claimed in claim 2, wherein the first gear and the first wedging member are rotated around the second axis.

4. The headband device as claimed in claim 2, wherein the vertical headband comprises a first rack, the vertical adjustment mechanism comprises a second gear and a second wedging member, the second wedging member is adapted to be wedged against the first wedged member, the second wedged member is adapted to rotate the second gear, and the second gear meshes with the first rack.

5. The headband device as claimed in claim 4, wherein the second gear and the second wedging member are rotated around the second axis.

6. The headband device as claimed in claim 4, wherein the first wedging member comprises a wedging post, the second wedging member comprises a wedging recess, the first wedging member is adapted to be inserted into the second wedging member, the first wedging member is moved between a first member position and a second member position, and when the first wedging member is in the first member position, the first wedging member is connected to the second wedging member, and when the first wedging member is in the second member position, the first wedging member is separated from the second wedging member.

7. The headband device as claimed in claim 6, further comprising a device housing, wherein when the first wedging member is in the first member position, the first wedging member protrudes out from an exterior of the device housing, and when the first wedging member is in the second member position, the first wedging member is inside the device housing, wherein the first wedging member or the second wedging member is a magnetic member.

8. The headband device as claimed in claim 7, further comprising a mechanism housing, wherein the vertical adjustment mechanism is located in the mechanism housing, a restriction groove is formed in the mechanism housing, and at least a portion of the vertical headband is restricted by the restriction groove.

9. The headband device as claimed in claim 8, wherein the device housing comprises a first magnetic portion, the mechanism housing comprises a second magnetic portion, and the first magnetic portion is adapted to be connected to the second magnetic portion by magnetic force.

10. The headband device as claimed in claim 1, further comprising:
   a second knob;
   a horizontal adjustment mechanism, connected to the second knob; and
   two horizontal headbands, connected to the horizontal adjustment mechanism, wherein the horizontal headbands are moved by the horizontal adjustment mechanism and the tightness of the horizontal headbands is adjustable.

11. The headband device as claimed in claim 10, wherein the second knob rotates around the first axis, and in a synchronous state, the second knob is rotated with the first knob, and in an asynchronous state, the second knob and the first knob are rotated separately.

12. The headband device as claimed in claim 11, further comprising a rotational plate and a spring, wherein the rotational plate is affixed to the second knob, the spring is disposed between the rotational plate and the first knob, in the synchronous state, the rotational plate is wedged against the first knob, and in the asynchronous state, the rotational plate is separated from the first knob.

13. The headband device as claimed in claim 12, wherein the first knob comprises a zigzag groove, the rotational plate comprises a plate post, and in the synchronous state, and the plate post stays in the zigzag groove.

14. The headband device as claimed in claim 13, wherein the zigzag groove comprises an inlet section, a first guiding section, a stop point, a second guiding section and an outlet section, the stop point is located between the first guiding section and the second guiding section, the plate post enters the zigzag groove through the inlet section, passes through the first guiding section to the stop point, and is adapted to leave the zigzag groove through the second guiding section and the outlet section, wherein in the synchronous state, the plate post stays in the stop point.

15. The headband device as claimed in claim 11, wherein the horizontal adjustment mechanism comprises a transmission shaft and a ratchet, each horizontal headband comprises a second rack, the transmission shaft is connected to the second knob, the ratchet is connected to the transmission shaft, the ratchet comprises a third gear, and the second rack meshes with the third gear.

16. A headband device, comprising:
 a vertical headband; and
 a magnetic member, disposed on the vertical headband, wherein the vertical head band is detachably connected to a horizontal headband via the magnetic member; and
 a vertical adjustment mechanism, wherein the vertical adjustment mechanism is rotated around a second axis, and a connection direction of the magnetic member is parallel to the second axis.

17. The headband device as claimed in claim 16, further comprising:
 a first knob, rotated around a first axis, wherein the vertical adjustment mechanism is connected to the first knob, the first axis is perpendicular to the second axis, the vertical headband is connected to the vertical adjustment mechanism, wherein the vertical headband is moved by the vertical adjustment mechanism and the tightness of the vertical headband is adjustable.

18. The headband device as claimed in claim 17, further comprising:
 a second knob;
 a horizontal adjustment mechanism, connected to the second knob; and
 two horizontal headbands, connected to the horizontal adjustment mechanism, wherein the horizontal headbands are moved by the horizontal adjustment mechanism and the tightness of the horizontal headbands is adjustable.

19. The headband device as claimed in claim 18, further comprising a rotational plate and a spring, wherein the second knob rotates around the first axis, and in a synchronous state, the second knob is rotated with the first knob, and in an asynchronous state, the second knob and the first knob are rotated separately, the rotational plate is affixed to the second knob, the spring is disposed between the rotational plate and the first knob, in the synchronous state, the rotational plate is wedged against the first knob, and in the asynchronous state, the rotational plate is separated from the first knob, the first knob comprises a zigzag groove, the rotational plate comprises a plate post, and in the synchronous state, the plate post stays in the zigzag groove.

\* \* \* \* \*